(12) United States Patent
Ren

(10) Patent No.: US 9,118,935 B2
(45) Date of Patent: Aug. 25, 2015

(54) MEDIA PROFILE BASED OPTIMIZATION OF MEDIA STREAMING SYSTEMS AND METHODS

(75) Inventor: Dahai Ren, Lincoln, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 436 days.

(21) Appl. No.: 13/602,481

(22) Filed: Sep. 4, 2012

(65) Prior Publication Data

US 2014/0068095 A1 Mar. 6, 2014

(51) Int. Cl.
*H04N 21/2343* (2011.01)
*H04N 21/258* (2011.01)

(52) U.S. Cl.
CPC ... *H04N 21/23439* (2013.01); *H04N 21/25825* (2013.01)

(58) Field of Classification Search
CPC .................. H04N 21/13439; H04N 21/25825
USPC ................................................. 709/231, 230
See application file for complete search history.

(56) References Cited

U.S. PATENT DOCUMENTS 8,131,875 B1 * 3/2012 Chen et al. .................... 709/246

* cited by examiner

*Primary Examiner* — Ario Etienne
*Assistant Examiner* — Sahera Halim

(57) ABSTRACT

An exemplary media streaming system 1) maintains media profile data representative of a plurality of media profiles supported by technical specifications of access devices included in a population of access devices, 2) defines, based on a statistical distribution of the access devices across the plurality of media profiles, a subset of the plurality of media profiles as benchmark media profiles, 3) maintains, for only the subset of the plurality of media profiles defined as the benchmark media profiles, media content data representative of different versions of a media content program, the different versions of the media content program corresponding to the media profiles included in the subset, and 4) uses the media content data representative of the different versions of the media content program corresponding to the media profiles included in the subset to stream the media content program. Corresponding methods and systems are also disclosed.

21 Claims, 11 Drawing Sheets

MEDIA PROFILE BASED OPTIMIZATION OF MEDIA STREAMING SYSTEMS AND METHODS

BACKGROUND INFORMATION

Streaming of media content (e.g., video or audio content) over wide area networks (e.g., the Internet, a carrier-specific network, etc.) is a growing industry fueled at least in part by advances in high-bandwidth network infrastructures. A media streaming service provider may leverage such network infrastructures to provide a media streaming service (e.g., an over-the-top video streaming service) to end users of the media streaming service.

End users of the media streaming service may utilize a variety of access devices to access and consume streaming media content by way of the service. The access devices may have a wide variety of technical specifications that provide myriad different sets of media processing capabilities. For example, access devices may have different display screen sizes, display screen resolutions, graphics processing chips, media format processing resources, network settings, network connections, and memory storage resources.

Because of the wide variety of technical specifications of access devices that may be used by users of a media streaming service, a provider of the service faces a dilemma in choosing how to allocate service provider resources in order to stream media content that is well suited for the variety of technical specifications of the access devices and that minimizes operational costs to provide the service. One approach is to maintain a unique, "best fit" version of media content for each unique set of technical specifications of the access devices. However, the operational costs to maintain copies of all of the different "best fit" versions of the media content (e.g., at multiple data centers in a content delivery network) is typically high.

Another approach is to maintain and use only a single version of media content to provide a different, "best fit" version of the media content to each access device. While this approach may reduce the operation costs associated with media content storage and maintenance, the operation costs to perform on-the-fly processing to convert (e.g., by live transcoding) the stored version of the media content to different "best fit" versions of the media content on demand is typically high. In addition, the on-the-fly conversions may introduce unwanted delays into media streaming operations.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media streaming systems and methods and optimizations thereof are described herein. As will be described below, the media streaming systems and methods described herein may be optimized to maintain benchmark versions of media content for an optimal set of benchmark media profiles. The media streaming systems and methods may use the benchmark versions of media content to stream "best fit" versions of the media content to one or more media content access devices ("access devices") as part of a media streaming service.

By maintaining and using benchmark versions of media content for an optimal set of benchmark media profiles, the media streaming systems and methods described herein may reduce the operational burdens and/or costs of providing a media streaming service. For example, as described in more detail herein, operational costs of media content data storage and maintenance and operational costs of on-the-fly conversions (e.g., live transcoding) of media content may be allocated in an optimal way to reduce the overall burdens and costs of providing the media streaming service.

These and/or other benefits provided by the disclosed exemplary media streaming systems and methods will be made apparent herein. Exemplary media streaming systems and methods and optimizations thereof will now be described with reference to the drawings.

As used herein, the term "streaming" may refer to delivery of media content in a manner that allows the media content to be received and presented for experiencing by a user before all of the media content is delivered (e.g., before an entire media content data file is delivered). For example, media content may be continuously streamed to an access device, and during the streaming, the access device may receive and present the media content (e.g., in real time).

As used herein, "media content" may refer to any media content program or set of media content programs. A "media content program" or "media program" may refer to any instance of media content that may be delivered by way of streaming the media content program. For example, a media content program may include a television program, a movie, a video program, an audio program (e.g., a song, an audio book, etc.), a pay-per-view program, IPTV media content, or any segment, component, or combination of these or other forms of media content that may be processed (e.g., temporally played back) by a media content access device receiving a stream carrying the media content program for experiencing by a user.

Figure 1:
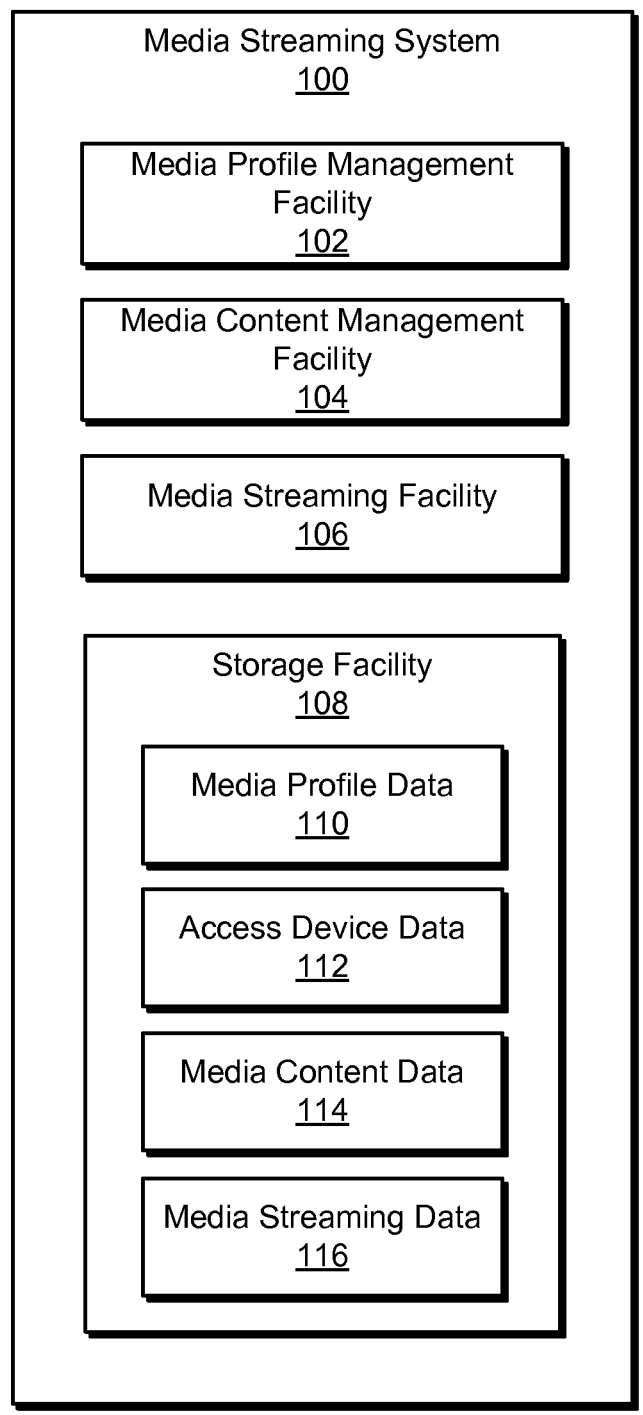
FIG. 1 illustrates an exemplary media streaming system according to principles described herein.

FIG. 1 illustrates an exemplary media streaming system 100 ("system 100"). As shown, system 100 may include, without limitation, a media profile management facility 102, a media content management facility 104, a media streaming facility 106, and a storage facility 108 selectively and communicatively coupled to one another. The facilities may be communicatively coupled one to another by way of any suitable communication technologies.

It will be recognized that although certain facilities of system 100 are shown to be separate facilities in FIG. 1, any of the facilities may be combined into fewer facilities, such as into a single element, or divided into more facilities as may serve a particular implementation.

The facilities of system 100 shown in FIG. 1 may include and/or be implemented by one or more computing devices. Exemplary implementations of system 100 and exemplary computing devices are described herein.

Storage facility 108 may be configured to store media profile data 110, access device data 112, media content data 114, and media streaming data 118, which may be generated, maintained, and/or used by media profile management facility 102, media content management facility 104, and/or media streaming facility 106 in any of the ways described herein. Examples of media profile data 110, access device data 112, media content data 114, and media streaming data 118 are described herein. Storage facility 108 may maintain additional or alternative data as may serve a particular implementation.

Media profile management facility 102 may be configured to maintain media profile data 110 representative of a plurality of media profiles supported by technical specifications of access devices included in a population of access devices. To illustrate, a population of access devices may include any group of access devices such as a group of access devices defined by a user of system 100 and/or associated with a media streaming service provided by system 100. For example, an exemplary population of access devices may include access devices that have interacted with a media streaming service provided by system 100 (e.g., requested and/or streamed media content by way of a media streaming service provided by system 100) over an unbounded or bounded period of time.

Access devices included in a population of access devices may have various technical specifications that support various sets of media processing capabilities. For example, a particular access device may have a particular native display screen resolution (e.g., 1080p), and another access device may have a different native display screen resolution (e.g., 720p). As used herein, "display screen resolution" may refer to a total number of pixels of a display screen, pixel dimensions of a display screen, number of pixels along one dimension of a display screen, pixel density (e.g., number of pixels within a display screen or an area of a display screen), or any other measurement of pixels or other discrete display elements of a display screen.

While certain examples described herein are described in terms of display screen resolutions, this is illustrative only. Additionally or alternatively to display screen resolutions, access devices may have different native media processing bit rates, display screen sizes, graphics processing chips, media processing resources for processing one or more specific media formats, network settings, network connections, memory storage resources, and/or any other technical specifications that affect media processing capabilities of the access devices.

The technical specifications of an access device may provide a set of media processing capabilities for the access device to use to process media content. The set of media processing capabilities may be suited for processing certain versions of media content but not other versions of media content. For example, an access device that has a native display screen resolution of 720p may be well-suited for processing versions of media content that have resolutions of 720p or less but may not be well-suited for processing versions of media content that have resolutions greater than 720p. Versions of media content that are well-suited for processing by an access device may be said to match the set of media processing capabilities of the access device. A version of media content that represents a media quality level that matches the highest media quality level that an access device is capable of processing (e.g., that maximizes the capabilities of the access device) may be said to be a "best fit" version of the media content for the access device.

A population of access devices may have various technical specifications supporting different, unique sets of media processing capabilities. Media profile data 110 may be defined to represent media profiles that correspond to unique sets of media processing capabilities of the access devices included in the population of access devices. To illustrate, a media profile may include data specifying characteristics of a version of media content. Thus, a media profile may define a version of media content that has a specified set of characteristics. The version of the media content defined by a media profile may correspond to (e.g., be the same as) a version of media content that matches a set of media processing capabilities included in the population of access devices. Thus, media profile data 110 may represent a plurality of media profiles that includes a unique media profile specifying a version of media content for each unique set of media processing capabilities included in the population of access devices.

Figure 2:
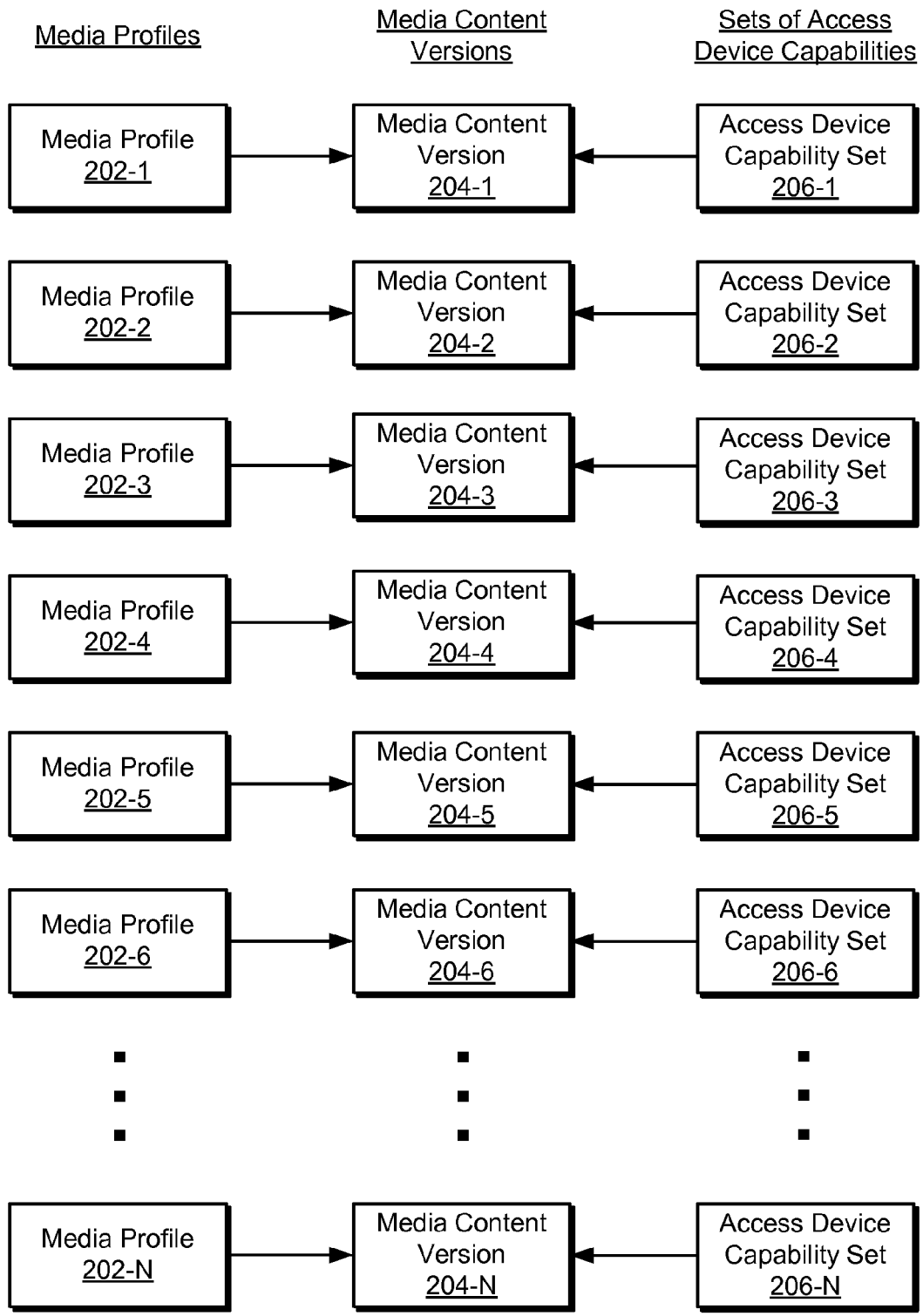
FIG. 2 illustrates an exemplary set of media profiles that specify a set of media content versions that correspond to unique media processing capability sets of a population of media content access devices according to principles described herein.

To illustrate, FIG. 2 shows an exemplary set of media profiles that specify versions of media content that are well-suited for unique sets of media processing capabilities of a population of access devices. As shown, a set of media profiles 202 (e.g., media profiles 202-1 through 202-N) may specify a set of media content versions 204 (media content versions 204-1 through 204-N), with each media profile 202 representing a different one of the media content versions 204. As further shown, the set of media content versions 204 may correspond to access device capability sets 206 (e.g., access device capability sets 206-1 through 206-N). For example, the set of media content versions 204 defined by the set of media profiles 202 may be the same versions of media content that are well-suited for the unique access device capability sets 206 included in a population of access devices.

To illustrate one example, access device capability set 206-1 may be well-suited for processing a version 204-1 of media content that has a display screen resolution of 1080p, has a bit rate of 3.8 megabits per second, and is encoded in an H.264 format. Media profile 202-1 may specify a matching version 204-1 of media content that has the same display screen resolution, bit rate, and format.

In certain examples, a plurality of media profiles represented by media profile data 110 may represent a plurality of versions of media content having different media quality levels. For example, the plurality of media profiles may define versions of media content that have a range of display screen resolutions, from a highest resolution to a lowest resolution.

Additional or alternative characteristics of media content specified by media profiles may contribute to the different media quality levels of the media content versions represented by the media profiles.

Figure 3:
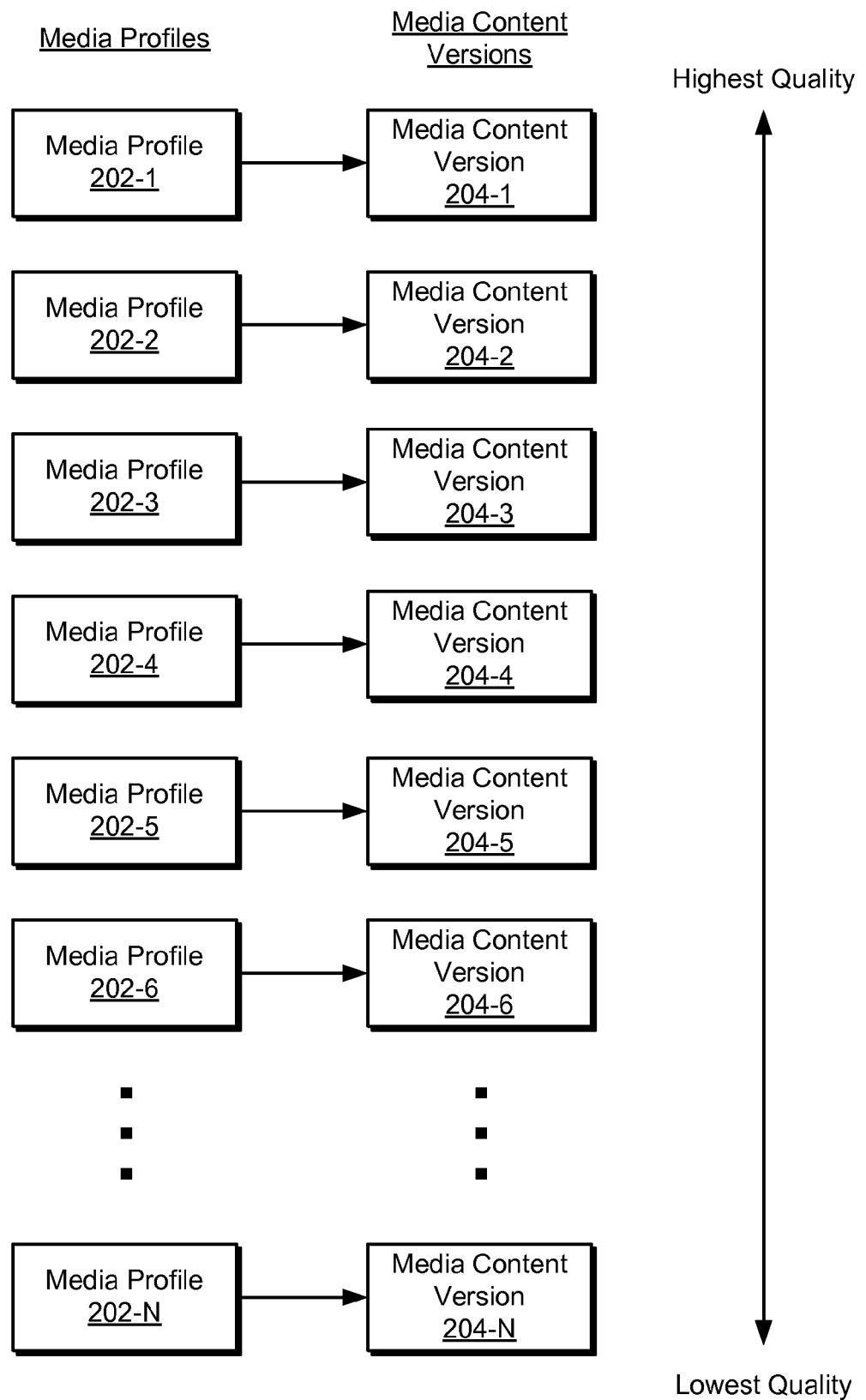
FIG. 3 illustrates an example in which media content versions specified by a set of media profiles are arranged from highest media quality to lowest media quality according to principles described herein.

To illustrate, media profiles 202 shown in FIG. 2 may represent media content versions 204 of different media quality levels (e.g., different display screen resolutions, bit rates, etc.). In some examples, the media content versions 204 may have a range of different media quality levels. FIG. 3 illustrates an example in which media content versions 204 are arranged (e.g., "laddered") from highest media quality to lowest media quality (e.g., highest to lowest display screen resolution).

The maintenance of media profile data 110 representing a plurality of media profiles by media profile management facility 102 may include media profile management facility 102 defining the media profile data 110. As an example, media profile management facility 102 may define the media profile data 110 representative of the plurality of media profiles based on user input received by media profile management facility 102. For instance, a user of system 100 may provide user input specifying a plurality of media profiles that corresponds to the unique sets of media processing capabilities within a population of access devices. Media profile management facility 102 may receive and use the user input to define the media profile data 110 to represent the plurality of media profiles.

As another example, media profile management facility 102 may define the media profile data 110 representative of the plurality of media profiles based on access device data, such as access device data 112. To illustrate, access device data 112, which may be maintained or otherwise be accessible by media profile management facility 102, may specify information about access devices included in a population of access devices. For example, access device data 112 may indicate technical specifications of access devices, "best fit" versions of media content for access devices, and/or any other information about a population of access devices. In certain examples, access device data 112 may be included in log data, such as media request log data about historical requests to access media content and/or media streaming log data about historical streaming of media content. Such log data may be maintained as media streaming data 118 by media streaming facility 106 for a media streaming service.

Media profile management facility 102 may access and identify from access device data 112, a plurality of media profiles supported by the technical specifications of the media content access devices included in a population of media content access devices. Based on the identified plurality of media profiles, media profile management facility 102 may then define media profile data 110 to represent the plurality of media profiles.

The maintenance of media profile data 110 representing a plurality of media profiles by media profile management facility 102 may further include media profile management facility 102 updating and/or otherwise managing the defined media profile data 110. For example, media profile management facility 102 may be configured to update media profile data 110 to represent an updated plurality of media profiles supported by technical specifications of an updated population of media content access devices. For instance, a new access device having a unique set of media processing capabilities may join the population of media content access devices (e.g., by registering for a media streaming service and/or making an initial request to the media streaming service for media content). Media profile management facility 102 may be configured to update the media profile data 110 to reflect the updated population of media content access devices, such as by adding a new media profile to the plurality of media profiles to form an updated plurality of media profiles or by assigning the new access device to an existing media profile to form an updated plurality of media profiles.

Because of operational costs associated with maintaining versions of media content for all of the media profiles in a plurality of media profiles defined for a population of access devices, a media streaming service provider may not want system 100 to maintain media content versions for all of the media profiles in the plurality of media profiles. Instead, benchmark media profiles may be defined and benchmark media content versions maintained for the benchmark media profiles.

Figure 4:
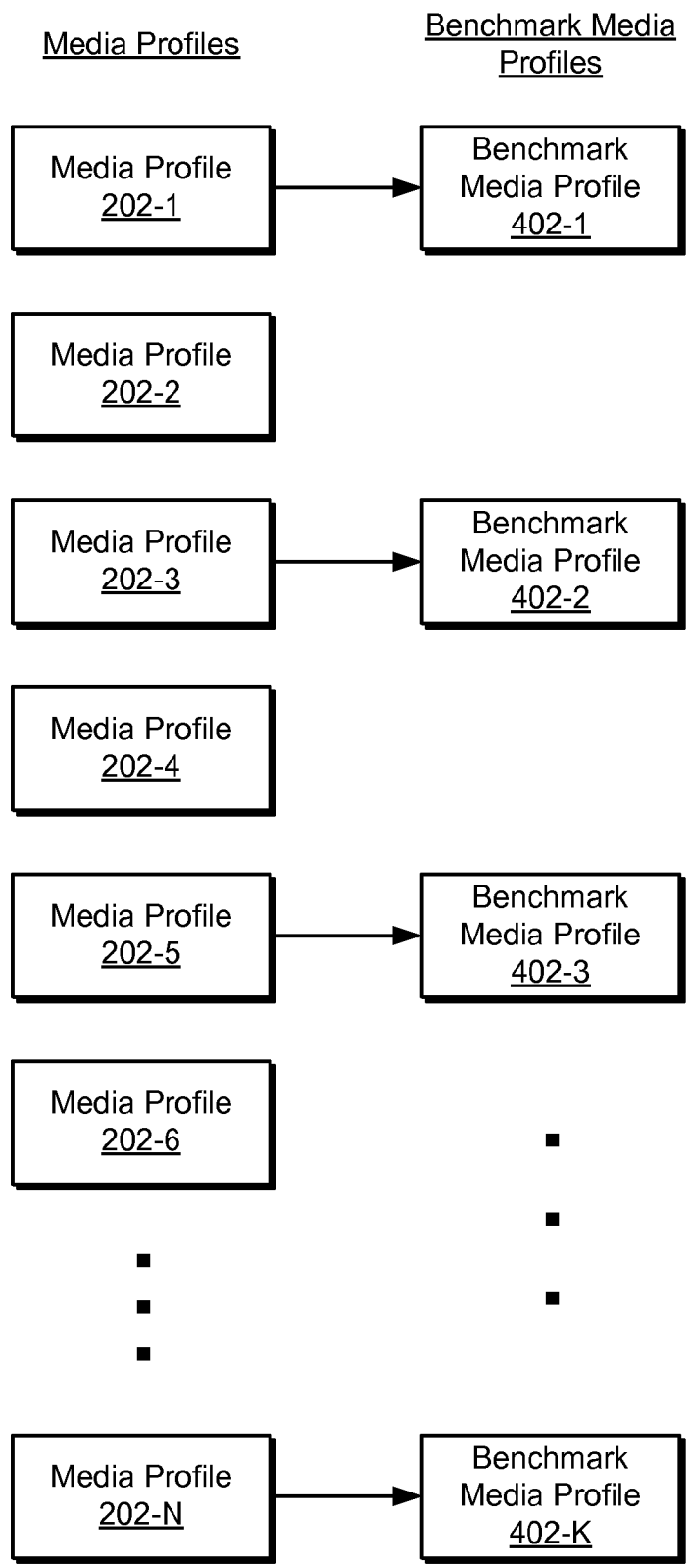
FIG. 4 illustrates an exemplary subset of media profiles defined as benchmark media profiles according to principles described herein.

To this end, media profile management facility 102 may be configured to define a subset of the plurality of media profiles for a population of access devices as benchmark media profiles. To illustrate, FIG. 4 shows an exemplary set of media profiles for a population of access devices, a subset of which is defined as a set of benchmark media profiles. In the example illustrated in FIG. 4, the subset of media profiles 202 includes media profiles 202-1, 202-3, 202-5, and 202-N defined as a set of benchmark media profiles 402 (e.g., benchmark media profiles 402-1 through 402-K). The remaining media profiles 202-2, 202-4, and 202-6 included in the set of media profiles 202 are not defined as benchmark media profiles.

In certain examples, the subset of the media profiles 202 may be selected and defined as the set of benchmark media profiles 402 based on a statistical distribution of access devices included in the population of access devices across the set of media profiles 202. A statistical distribution of access devices may include any statistical representation of an allocation of the access devices included in the population of access devices across the set of media profiles 202.

As an example, the statistical distribution may be based on a number of access devices associated with each media profile included in the set of media profiles 202. To illustrate, as described above, a population of access devices may have a plurality of unique media processing capability sets (e.g., access device capability sets 206). Each unique access device capability set may be associated with any number of access devices included in the population of access devices. For example, the population may include ten access devices having access device capability set 206-1 (e.g., ten iPhone 4s devices), one access device having access device capability set 206-2 (e.g., one Palm Pre device), and so on. The number of access devices associated with the access device capability sets 206 may be distributed across the media profiles 202 corresponding to the access device capability sets 206. For example, the ten access devices having access device capability set 206-1 may be allocated to corresponding media profile 202-1, the one access device having access device capability set 206-2 may be allocated to corresponding media profile 202-2, and so on.

As another example, the statistical distribution may be based on a number of media streaming requests and/or streaming sessions associated with each media profile included in the set of media profiles 202. To illustrate, requests to stream media content may be received from access devices included in a population of access devices over time. Each request may be for a media content version 204 associated with a particular media profile 202. Accordingly, historical media request log data may be used to determine a statistical distribution of media content streaming requests across the set of media profiles 202.

These examples are illustrative only. Additional or alternative statistical distributions across the set of media profiles 202 for a population of access devices may be used in other examples.

A statistical distribution across the set of media profiles 202 may be determined in any suitable way. As an example, media profile management facility 102 may receive user input provided by a user of system 100 and specifying the statistical distribution. As another example, media profile management facility 102 may generate the statistical distribution based on access device data 112 and/or media streaming data 118 (e.g., media request and/or streaming log data).

After the statistical distribution is determined, media profile management facility 102 may identify a subset of media profiles 202 as benchmark media profiles 402 based on the statistical distribution and on a benchmark media profile selection heuristic maintained and/or accessible by media profile management facility 102. The heuristic may specify logic that is configured to be used by media profile management facility 102 to direct the selection of the benchmark media profiles 402 based on the statistical distribution of access devices across the set of media profiles 202. The logic may represent one or more business rules configured to direct media profile management facility 102 to select a set of benchmark media profiles 402 that will minimize operational burden and/or costs of providing a media streaming service.

To illustrate, a specific example will now be described. In the present example, an exemplary population of access devices includes one hundred access devices (i.e., access device D1 through access device D100) that have ten unique media processing capability sets classified into ten respective media profiles (i.e., Profile 1 through Profile 10). In some examples, the ten profiles may be ordered by quality level of versions of media content defined by the profiles. For example, Profile 1 may represent a highest media quality level (e.g., a highest screen resolution), and Profile 10 may represent a lowest media quality level (e.g., a lowest screen resolution).

Figure 5:
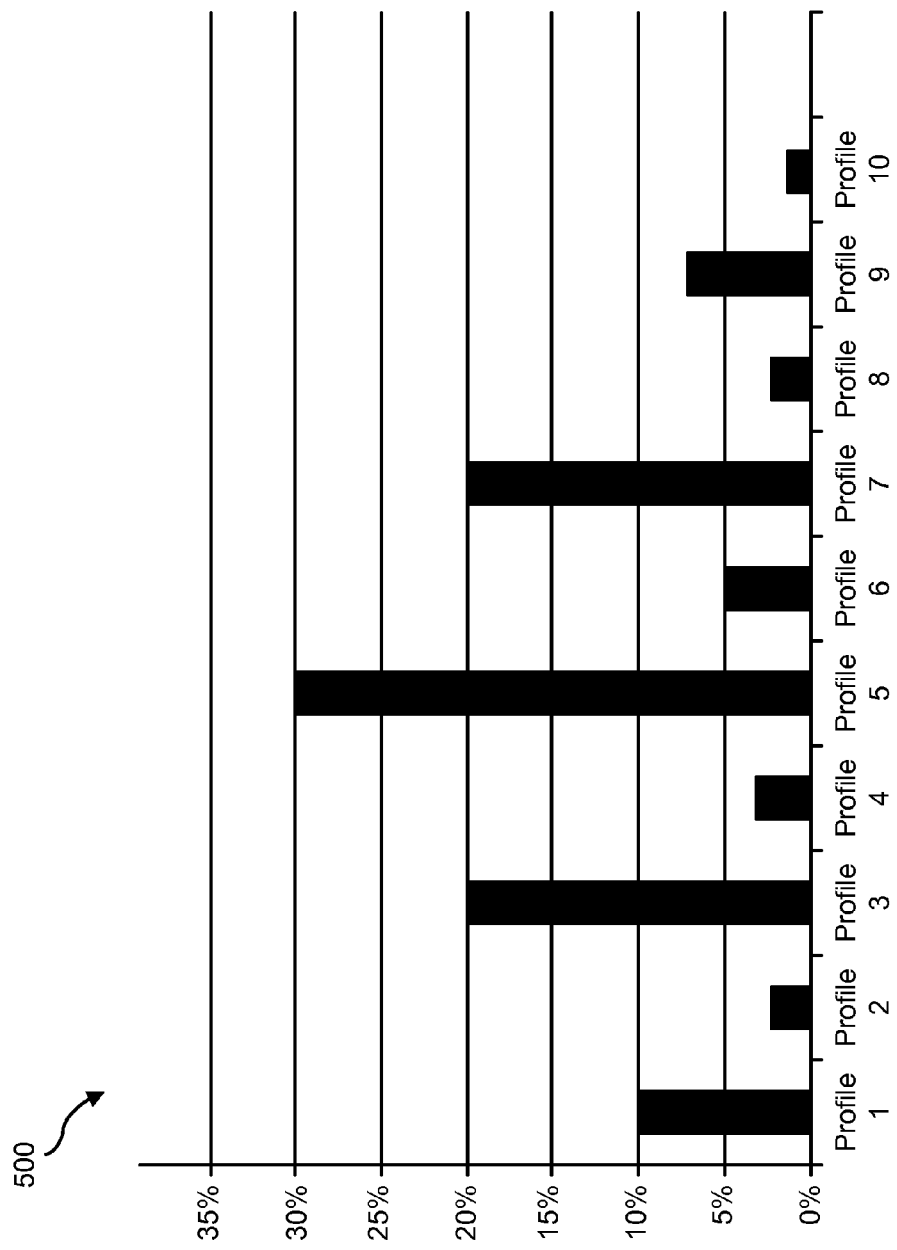
FIG. 5 illustrates a graphical depiction of a statistical distribution of media content access devices included in a population of media content access devices across a set of media profiles according to principles described herein.

A statistical distribution of the one hundred access devices across the ten media profiles may include ten of the access devices (e.g., access devices D1 through D10) allocated to the first profile, two of the access devices (e.g., access devices D11 and D12) allocated to the second profile, twenty of the access devices (e.g., access devices D13 through D32) allocated to the third profile, three of the access devices (e.g., access devices D33 through D35) allocated to the fourth profile, thirty of the access devices (e.g., access devices D36 through D65) allocated to the fifth profile, five of the access devices (e.g., access devices D66 through D70) allocated to the sixth profile, twenty of the access devices (e.g., access devices D71 through D90) allocated to the seventh profile, two of the access devices (e.g., access devices D91 and D92) allocated to the eighth profile, seven of the access devices (e.g., access devices D93 through D99) allocated to the ninth profile, and one of the access devices (e.g., e.g., access device D100) allocated to the tenth profile. FIG. 5 illustrates a graph 500 graphically depicting the statistical distribution of the one hundred access devices across the ten media profiles in the present example.

To continue the present example, the benchmark media profile selection heuristic maintained or otherwise accessible by media profile management facility 102 may direct media profile management facility 102 to identify a particular subset of the ten profiles to be defined as benchmark media profiles. For example, based on logic defined by the heuristic, media profile management facility 102 may determine that eighty-seven percent of the one hundred access devices are allocated to Profiles 1, 3, 5, 7, and 9 in the statistical distribution. Based on this determination, media profile management facility 102 may identify Profiles 1, 3, 5, 7, and 9 as the subset of the ten media profiles to be defined as benchmark media profiles.

The benchmark selection heuristic may be defined such that the identified subset of the ten media profiles may represent an optimal set of media profiles for which copies of media content versions should be maintained by system 100. For example, the heuristic may specify a threshold percentage of a population of access devices (e.g., eighty-five percent of the population) to be associated with the set of benchmark media profiles. As another example, the heuristic may specify a threshold percentage of the population of access devices (e.g., six percent of the population) to be associated with each media profile in order for that media profile to be defined as a benchmark media profile. As another example, the heuristic may specify a minimum number of non-benchmark media profiles that are allowed to exist between pairs of benchmark media profiles in a set of media profiles in which the media profiles are ordered by media quality levels represented by the media profiles. As another example, the heuristic may specify a minimum and/or maximum percentage or number of media profiles that may be defined as benchmark media profiles. The heuristic may specify that any of these criteria, additional or alternative criteria, or combinations or sub-combinations therefore be used to direct media profile management facility 102 in the selection of the optimal set of benchmark media profiles. The optimal set of benchmark media profiles may minimize operational burden and/or costs of providing a media streaming service.

Selecting more or less than the optimal set of media profiles for benchmark media profiles may increase the operational burden and/or costs of providing a media streaming service. As an example, to maintain copies of media content versions for additional number of benchmark media profiles may increase the overall operational burden and/or costs of providing a media streaming service. To illustrate, if Profile 6 is added to the five media profiles defined as benchmark media profiles, a total of six media content versions corresponding to the six benchmark media profiles will be maintained for each media content program. The operational costs of doing this may be higher than the costs to convert a media content version associated with Profile 5 to Profile 6 in real time in order to provide the media content to the five access devices allocated to Profile 6.

As another example, to maintain copies of media content versions for a fewer number of benchmark media profiles may also increase the overall operational burden and/or costs of providing a media streaming service. To illustrate, if Profile 9 is removed from the five media profiles defined as benchmark media profiles, a total of four media content versions associated with four benchmark profiles will be maintained for each media content program. The benefit of maintaining one less version of media content for each media content program provided by a media streaming service may be less than the operational costs of adding additional hardware to convert a media content version associated with Profile 7 to Profile 9 in real time in order to provide the media content to the seven access devices allocated to Profile 9. Additional costs may also be incurred for hardware to convert the media content version associated with Profile 7 to Profile 10 in real time in order to provide the media content to the access device allocated to Profile 10.

Figure 6:
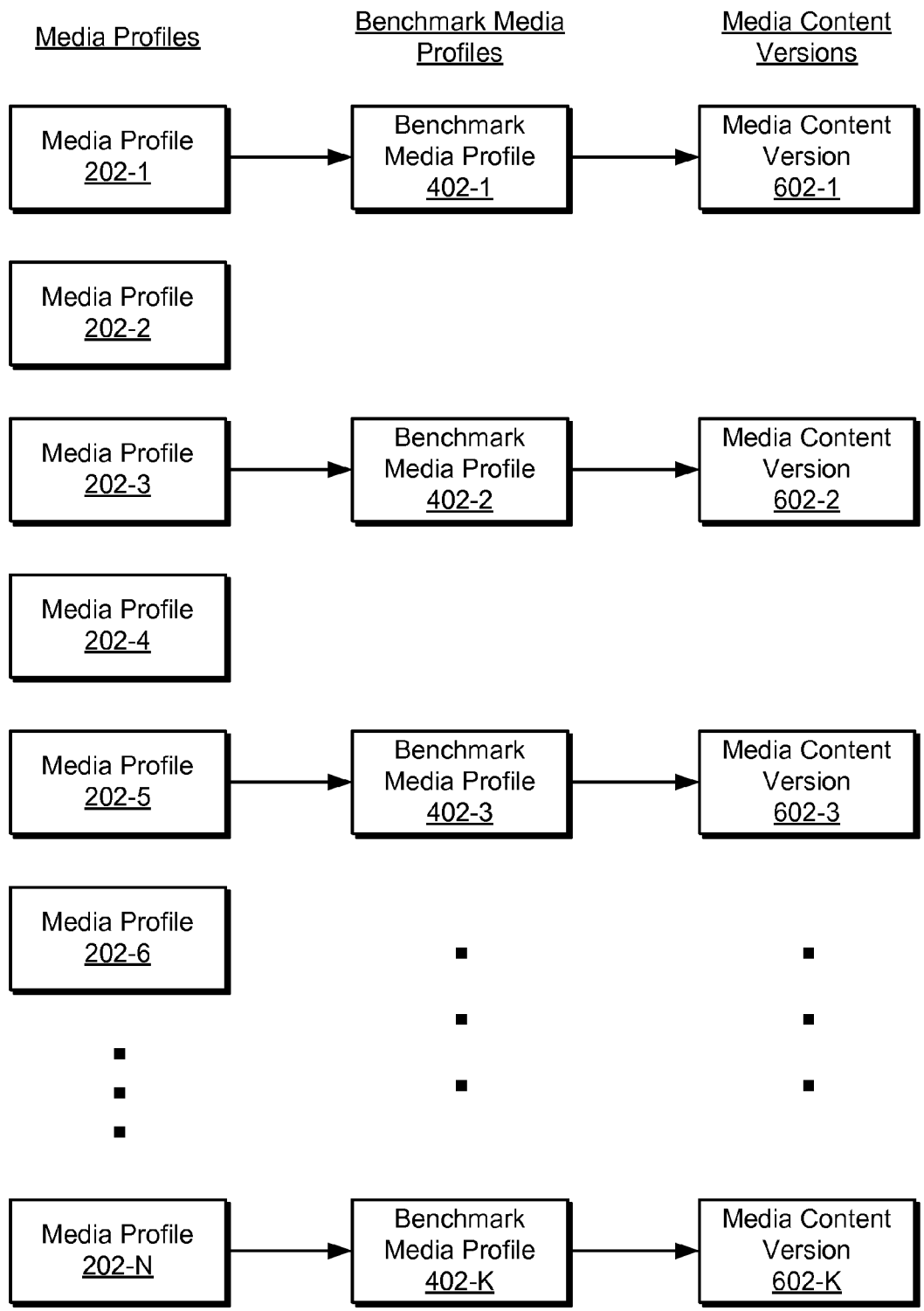
FIG. 6 illustrates an example of a subset of media profiles defined as benchmark media profiles and media content versions corresponding to the benchmark media profiles according to principles described herein.

Media content management facility 104 may be configured to maintain, for the subset of media profiles defined as benchmark media profiles, media content data 114 representative of different versions of media content, the different versions of the media content corresponding to the media profiles included in the subset (i.e., the benchmark media profiles). In certain examples, media content management facility 104 may maintain different versions of media content for only the subset of media profiles defined as benchmark media profiles. To illustrate, FIG. 6 shows the exemplary set of media profiles 202 for a population of access devices, a subset of which is defined as a set of benchmark media profiles. In the example illustrated in FIG. 6, the subset of media profiles 202 includes media profiles 202-1, 202-3, 202-5, and 202-N defined as the set of benchmark media profiles 402 (e.g., benchmark media profiles 402-1 through 402-K). FIG. 6 further illustrates benchmark media content versions 602 (e.g., benchmark media content versions 602-1 through 602-K) that are maintained by media content management facility 104 for the benchmark media profiles 402. As shown, media content management facility 104 may maintain benchmark media content versions 602 for only the subset of media profiles 202-1, 202-3, 202-5, and 202-N defined as the benchmark media profiles 402 and not for the remaining non-benchmark media profiles 202-2, 202-4, and 202-6 not included in the subset.

For example, for a particular media content program (e.g., a video program) maintained by media content management facility 104 for streaming by system 100, media content management facility 104 may maintain different versions of the media content program that correspond to defined benchmark media profiles. The maintaining of different versions of a media content program for the benchmark media profiles may include maintaining one or more copies of each version of the media program. For instance, copies of each different version of the media content program may be stored across nodes of multiple data centers in a content delivery network for use by system 100 to stream the media content program (e.g., on demand in response to requests for the media content program).

In some examples, the benchmark media content versions 602 may be ordered by quality level. For example, benchmark media content version 602-1 may have a highest media quality level (e.g., a highest screen resolution) and benchmark media content version 602-K may have a lowest media quality level (e.g., a lowest screen resolution) in a quality-laddered set of benchmark media content versions 602.

Figure 7:
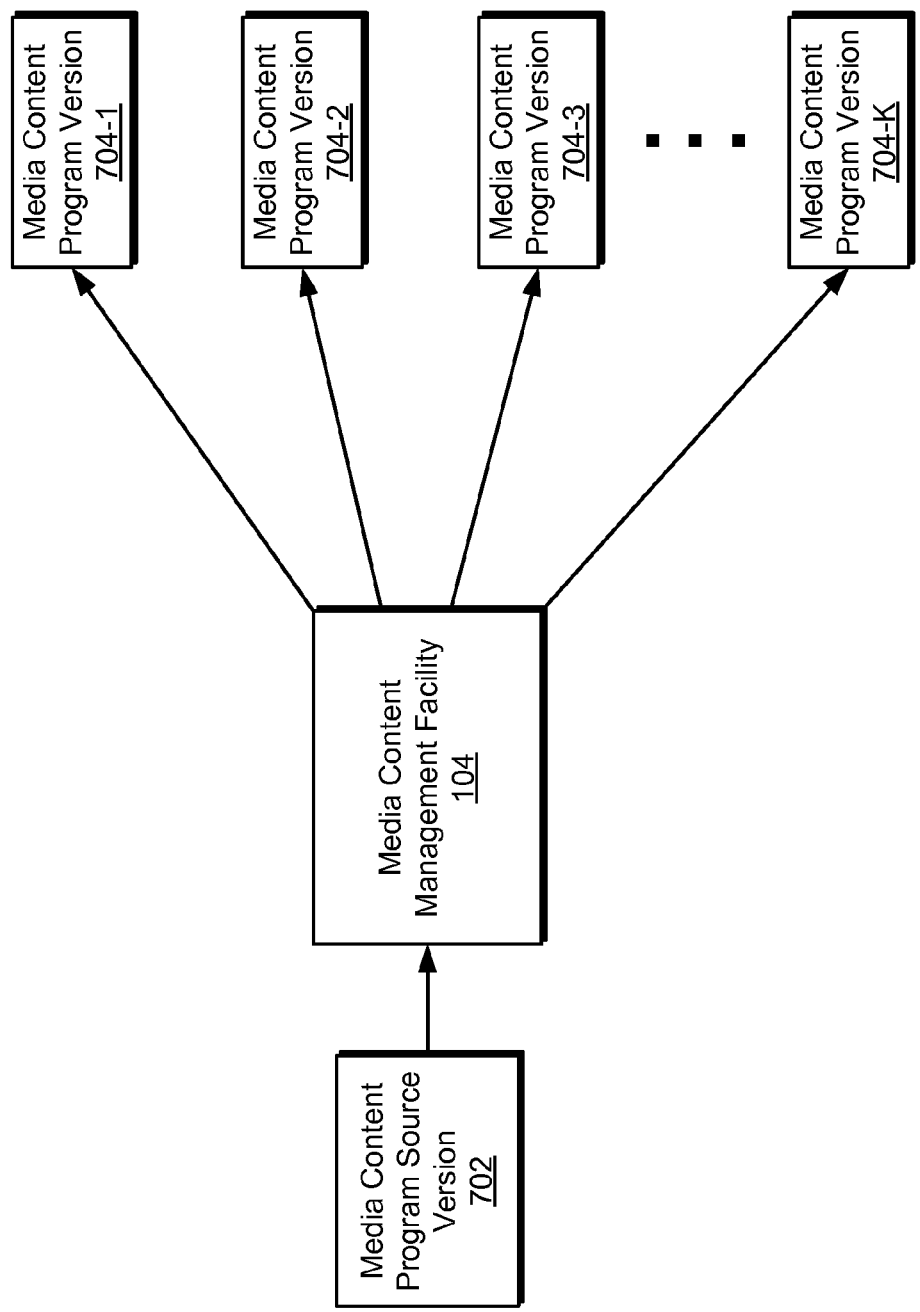
FIG. 7 illustrates an exemplary conversion of a source version of a media content program to generate multiple, different versions of the media content program that correspond to defined benchmark media profiles according to principles described herein.

In certain examples, the maintaining of media content data 114 representative of different versions of a media content program may include media content management facility 104 receiving a source version of the media content program from a content provider (e.g., from a content producer such as ESPN, ABC, FOX, etc.), converting (e.g., downscaling, transcoding, etc.) the source version of the media content program to generate the different versions of the media content program that correspond to the benchmark media profiles 602, and storing the different versions of the media content program (e.g., one or more copies of each version of the media content program at one or more data centers in a content delivery network) for use by system 100 to stream the media content program. FIG. 7 illustrates media content management facility 104 receiving a source version 702 of a media content program and generating multiple, different versions 704 (e.g., versions 704-1 through 704-K) of the media content program that correspond to defined benchmark media profiles (e.g., benchmark media profiles 402). In certain examples, source version 702 may represent a highest quality level of the media content program maintained by media content management facility 104, and versions 704 may represent different quality levels (e.g., lower quality levels) of the same media content program.

Media streaming facility 106 may be configured to use the media content data 114 representative of the different versions of media content corresponding to the benchmark media profiles to stream the media content. For example, versions 704 of a media content program shown in FIG. 7 may be used by media streaming facility 106 to stream the media content program (e.g., on demand in response to requests for the media content program).

To illustrate, media streaming facility 106 may receive a request from an access device to access a media content program. In response to the request, media streaming facility 106 may determine that the access device from which the request is received is associated with a media profile included in a set of media profiles, select, based on the media profile associated with the access device, a version of the media content program corresponding to the media profile from the different versions of the media content program maintained by media content management facility 104, and use a copy of the selected version of the media content program to stream the media content program to the access device from which the request is received.

For example, a user of an access device may want to watch a movie titled "Batman Begins." The user may use the access device to initiate and send a request for the movie to a media streaming service provided by system 100. Media streaming facility 106 may receive the request for the movie and determine that the access device that sent the request has technical specifications that provide a set of media processing capabilities that match a particular media profile. The determination of the media profile that matches the access device may be made in any suitable way, such as based on a signature of the access device and/or data provided by the access device to system 100. Based on the identified media profile, media streaming facility 106 may select and use a version of the movie maintained by media content management facility 104 to stream the movie to the access device.

In some examples, the requesting access device may be determined to be associated with a benchmark media profile. In such examples, the copy of the version of the media content program corresponding to the benchmark media profile may be streamed to the access device as the "best fit" version of the media content program for the access device without converting the version of the media content program to another media profile (e.g., without having to downscale, or transcode the media content program).

For example, the requesting access device may be associated with benchmark media profile 402-2 shown in FIG. 6. Accordingly, media streaming facility 106 may select and use media content version 602-2 to fulfill the request by streaming media content version 602-2 to the access device as the "best fit" version of the media content program for the access device.

In some examples, the requesting access device may be determined to be associated with a media profile that is not a benchmark media profile. In such examples, media streaming facility 106 may select a benchmark media profile that represents a media quality level that is proximate to the media quality level represented by the media profile associated with the access device and use the version of the media content program associated with the selected benchmark media profile to generate and stream a "best fit" version of the media content program for the access device to the access device.

As an example, media streaming facility 106 may select a benchmark media profile that represents a next higher available media quality level (from the media quality level represented by the non-benchmark media profile associated with the access device), convert (e.g., downscale) a copy of the version of the media content program associated with the selected benchmark media profile to a version of the media content program that corresponds to the media profile associated with the access device, and stream the post-conversion version of the media content program to the access device as a "best-fit" version for the access device.

For example, the requesting access device may be associated with media profile 202-4 shown in FIG. 6. The next higher available media quality level from the media quality level represented by media profile 202-4 may be represented by media profile 202-3, which has been defined to be benchmark media profile 402-2. Accordingly, media streaming facility 106 may select and use media content version 602-2 to fulfill the request by converting media content version 602-2 to another version that matches media profile 202-4 and stream the other version of the media content program to the access device as the "best fit" version of the media content program for the access device.

As another example, instead of media streaming facility 106 selecting a benchmark media profile that represents a next higher available media quality level than the media quality level represented by the media profile associated with the requesting access device as described above, media streaming facility 106 may select a benchmark media profile that represents a next lower available media quality level than the media quality level represented by the media profile associated with the requesting access device and use a version of the media content program associated with the selected benchmark media profile to fulfill the request. For instance, media streaming facility 106 may select a benchmark media profile that represents a next lower available media quality level from the media quality level represented by the media profile associated with the requesting access device as described above and stream the version of the media content program corresponding to the selected benchmark media profile to the access device to fulfill the request without converting the version of the media content program to a "best fit" version for the access device. An access device is typically capable of processing versions of media content that have quality levels that are lower than the "best fit" quality level of the access device.

For example, the requesting access device may be associated with media profile 202-4. The next lower available media quality level from the media quality level represented by media profile 202-4 may be represented by media profile 202-5, which has been defined to be benchmark media profile 402-3. Accordingly, media streaming facility 106 may select and use media content version 602-3 to fulfill the request by streaming media content version 602-3 to the access device.

In certain examples, media streaming facility 106 may be configured to dynamically select which version of a requested media content program to use for streaming based on a current status of resources associated with a media streaming service (e.g., server resources, network resources, current network conditions, etc.). To illustrate, media streaming facility 106 may receive a request from an access device to access a media content program and determine that the requesting access device is associated with a media profile that is not a benchmark media profile. In such examples, media streaming facility 106 may select a benchmark media profile and a corresponding version of the media content program to use to fulfill the request based on a current status of resources associated with a media streaming service.

For example, media streaming facility 106 may determine current network conditions. If current network conditions show availability of sufficient network resources (e.g., availability above a predetermined threshold), media streaming facility 106 may select a next higher available media quality level represented by a benchmark media profile and use a version of the media content program corresponding to the benchmark media profile to fulfill the request, such as by downgrading the quality of) the version of the media content program corresponding to the benchmark media profile to a lower quality version and streaming the downgraded version of the media content program. Alternatively, if current network conditions show a lack of availability of sufficient network resources (e.g., availability below a predetermined threshold), media streaming facility 106 may select a next lower available media quality level represented by a benchmark media profile and use a version of the media content program associated with the benchmark media profile to fulfill the request.

Figure 8:
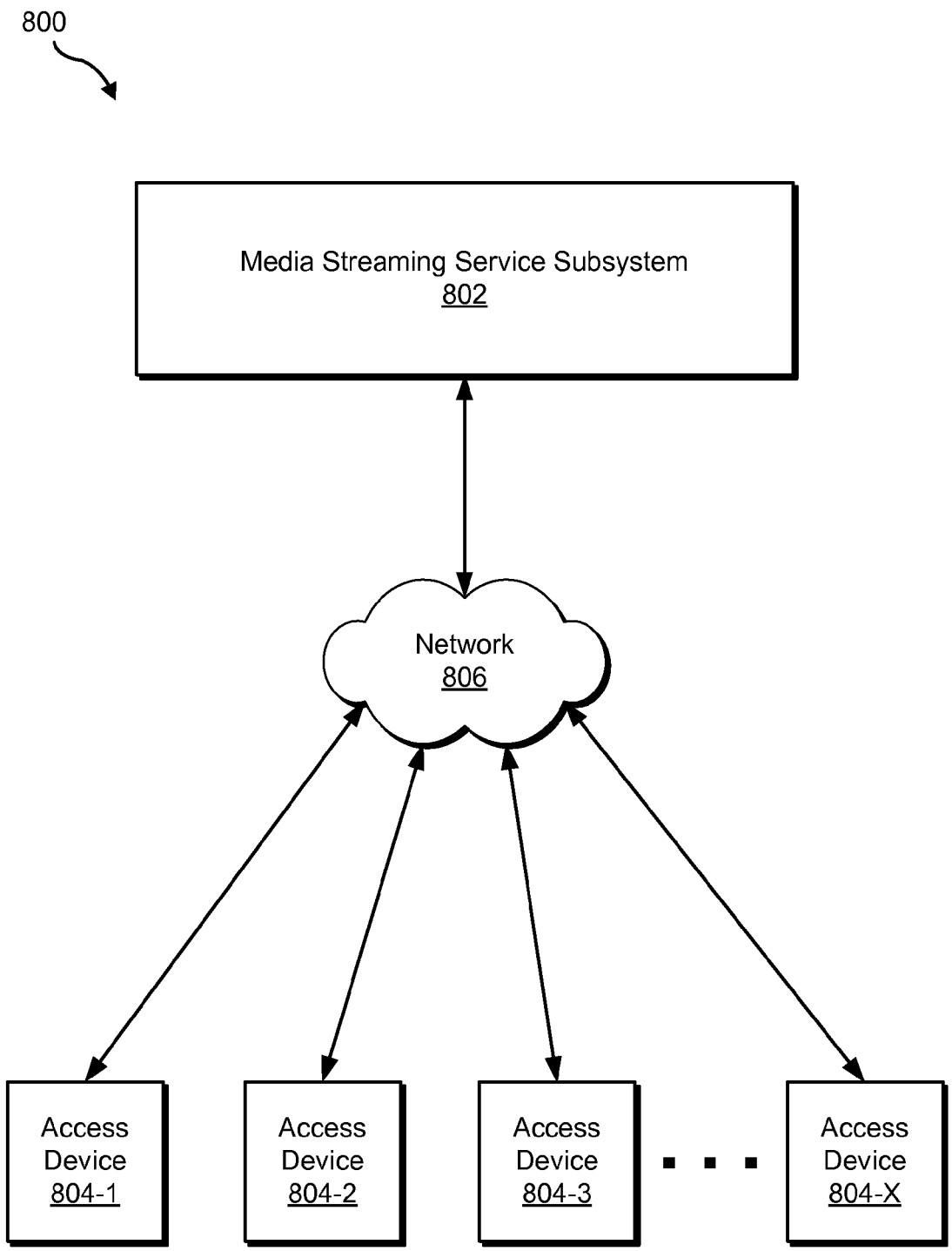
FIG. 8 illustrates an exemplary implementation of the system of FIG. 1 according to principles described herein.

FIG. 8 illustrates an exemplary implementation 800 of system 100. As shown, implementation 800 may include a media streaming service subsystem 802 and a population of access devices 804 (e.g., access devices 804-1 through 804-X) communicatively coupled to media streaming service subsystem 802.

Access devices 804 may be associated with users, who may be end users of (e.g., subscribers to) a media streaming service (e.g., an on-demand video streaming service, a multi-screen video streaming service that allows an end user to utilize a variety of devices to access streaming video content, an audio streaming service, and any other media content program streaming service) provided by media streaming service subsystem 802. The users may utilize access devices 804 to request, access, and consume media content streamed by media streaming service subsystem 802.

Access devices 804 may include or be implemented by any end-user, terminal computing devices configured to access a media streaming service provided by media streaming service subsystem 802. Examples of access devices 804 may include, but are not limited to, mobile phones, smart phones, tablet computers, personal computers, mobile computing devices, vehicular computing devices, set-top box devices, gaming console devices, and media player devices.

Access devices 804 may communicate with media streaming service subsystem 802 using any suitable communication technologies, including communication technologies that support delivery of streamed media content from media streaming service subsystem 802 to one or more access devices 804. Examples of such communication technologies may include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), Session Initiation Protocol ("SIP"), Real-Time Transport Protocol ("RTP"), User Datagram Protocol ("UDP"), in-band and out-of-band signaling technologies, wide area network communication technologies, Internet communication technologies, Hypertext Transfer Protocol ("HTTP"), progressive media streaming technologies, adaptive rate HTTP media streaming technologies, and other suitable communications and/or data transport technologies (e.g., other media streaming technologies), or any combination or sub-combination thereof.

In certain examples, access devices 804 may communicate with media streaming service subsystem 802 by way of a network 806, which may include one or more networks provided by one or more appropriately configured network devices (and communication links thereto) and over which media content may be transported between computing devices such as from media streaming service subsystem 802 to one or more access devices 804. Network 806 may include, but is not limited to, a mobile phone network (e.g., a cellular phone network, a 3G data network, a 4G data network, etc.), a satellite media broadcasting network, a terrestrial media broadcasting network, a wide area network, the Internet, and/or any other network(s) capable of transporting communications between access devices 804 and media streaming service subsystem 802 and transporting streaming media content from media streaming service subsystem 802 to access devices 804.

In certain examples, "over-the-top" streaming technology may be used by media streaming service subsystem 802 to stream media content from media streaming service subsystem 802 to access devices 804 by way of network 806. Other suitable streaming configurations may be used in other examples.

Media streaming service subsystem 802 may include one or more computing devices (e.g., one or more server devices) configured to perform one or more server-side operations to provide a media streaming service to users of access devices 804. In certain examples, media streaming service subsystem 802 may include or provide a content data network that may include one or more data centers housing computing equipment configured to provide a media streaming service, such as a video-on-demand streaming service and/or an audio streaming service.

System 100 may be implemented by implementation 800 in any suitable way. For examples, any of facilities 102-108 of system 100 may be implemented entirely by media streaming service subsystem 802 or distributed across media streaming service subsystem 802 and access devices 804.

Figure 9:
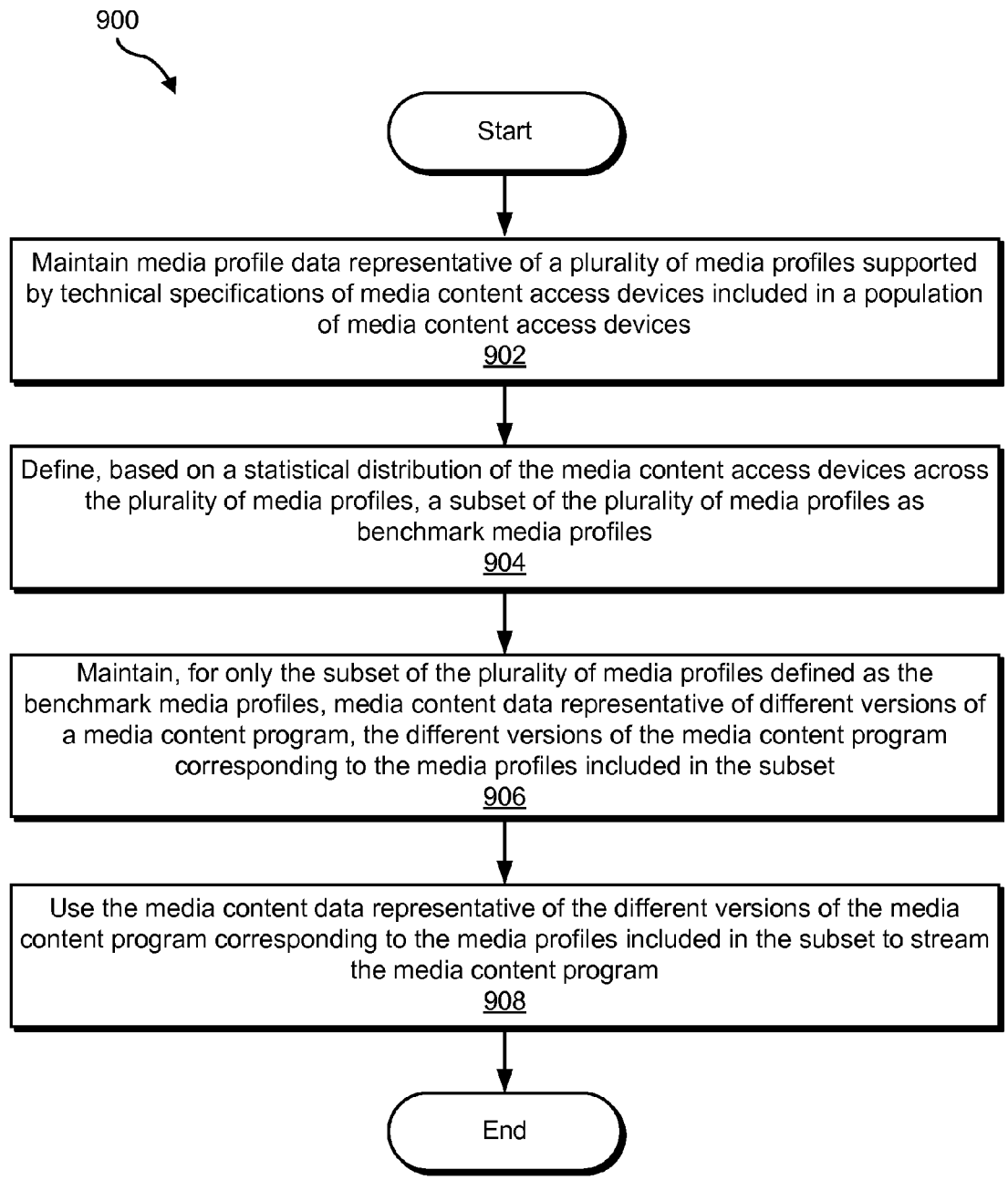
FIGS. 9-10 illustrate exemplary methods of optimized media streaming according to principles described herein.

FIG. 9 illustrates an exemplary method 900 of optimized media streaming. While FIG. 9 illustrates exemplary steps according to certain embodiments, other embodiments may omit, add to, reorder, combine, and/or modify any of the steps shown in FIG. 9. One or more of the steps shown in FIG. 9 may be performed by system 100 and/or any component(s) or implementations thereof.

In step 902, system 100 maintains media profile data representative of a plurality of media profiles supported by technical specifications of media content access devices included in a population of media content access devices, such as described herein.

In step 904, system 100 defines, based on a statistical distribution of the media content access devices across the plurality of media profiles, a subset of the plurality of media profiles as benchmark media profiles, such as described herein.

In step 906, system 100 maintains, for only the subset of the plurality of media profiles defined as the benchmark media profiles, media content data representative of different versions of a media content program, the different versions of the media content program corresponding to the media profiles included in the subset (i.e., the benchmark media profiles), such as described herein.

In step 908, system 100 uses the media content data representative of the different versions of the media content program corresponding to the media profiles included in the subset (i.e., the benchmark media profiles) to stream the media content program (e.g., on demand), such as described herein.

Figure 10:
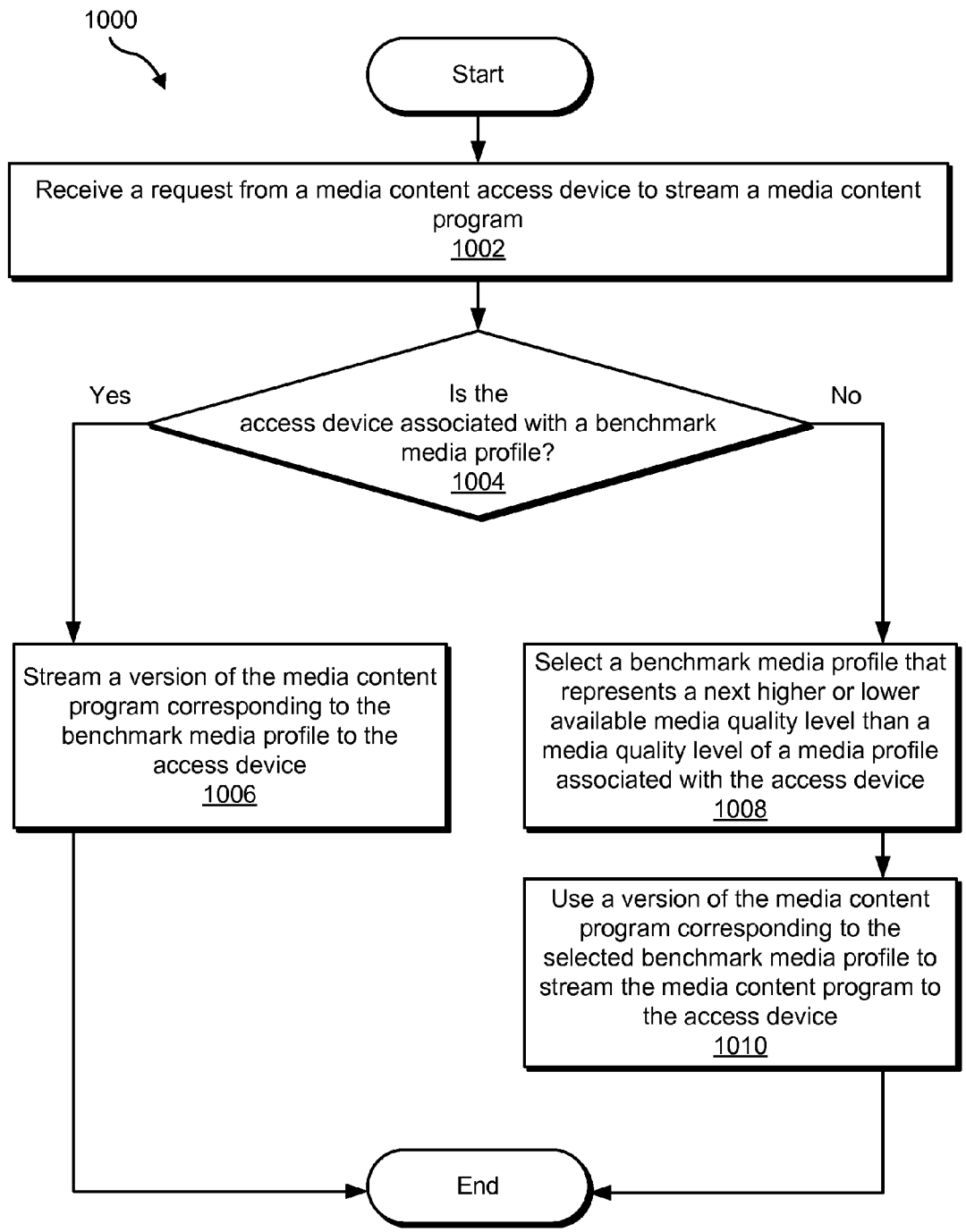

FIG. 10 illustrates an exemplary method 1000 of optimized media streaming. While FIG. 10 illustrates exemplary steps according to certain embodiments, other embodiments may omit, add to, reorder, combine, and/or modify any of the steps shown in FIG. 10. One or more of the steps shown in FIG. 10 may be performed by system 100 and/or any component(s) or implementations thereof. In certain examples, one or more of the steps of method 1000 may be performed as part of step 908 of method 900 shown in FIG. 9.

In step 1002, system 100 receives a request from a media content access device to stream a media content program, such as described herein. Any of steps 1004-1010 may be performed by system 100 in response to the receipt of the request in step 1002.

In step 1004, system 100 determines whether the media content access device is associated with a benchmark media profile. The determination may be made in any suitable way, including any of those described herein.

If system 100 determines in step 1004 that the media content access device is associated with a benchmark media profile, processing moves from step 1004 to step 1006. In step 1006, system 100 streams a version of the media content program corresponding to the benchmark media profile to the media content access device to fulfill the request, such as described herein. Method 1000 then ends.

On the other hand, if system 100 determines in step 1004 that the media content access device is not associated with a benchmark media profile, processing moves from step 1004 to step 1008. In step 1008, system 100 selects a benchmark media profile that represents a next higher or lower available media quality level from a media quality level of a media profile associated with the media content access device. System 100 may select the benchmark media profile that represents either the next higher or lower media quality level in any of the ways described herein, including based on current resource conditions associated with a media streaming service.

In step 1010, system 100 uses a version of the media content program corresponding to the selected benchmark media profile to stream the media content program to the media content access device. Step 1010 may be performed in any of the ways described herein and may include converting or not converting the version of the media content program corresponding to the selected benchmark media profile to another version (e.g., a "best fit" version) of the media content program, such as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
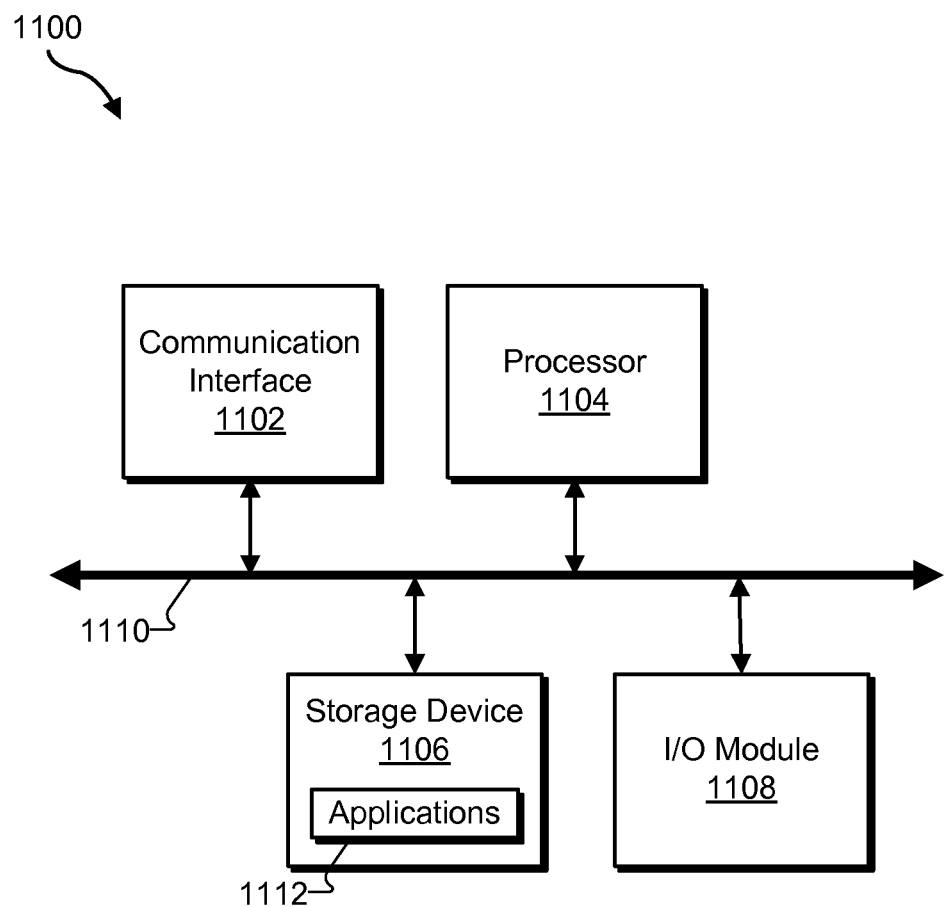
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems, subsystems, facilities, and/or modules described herein may be implemented by or within one or more components of computing device 1100. For example, one or more applications 1112 residing within storage device 1106 may be configured to direct processor 1104 to perform one or more processes or functions associated with media profile management facility 102, media content management facility 104, and/or media streaming facility. Likewise, storage facility 108 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
maintaining, by a media streaming system, media profile data representative of a plurality of media profiles supported by technical specifications of media content access devices included in a population of media content access devices;
defining, by the media streaming system based on a statistical distribution of the media content access devices across the plurality of media profiles, a subset of the plurality of media profiles as benchmark media profiles;
maintaining, by the media streaming system for only the subset of the plurality of media profiles defined as the benchmark media profiles, media content data representative of different versions of a media content program, the different versions of the media content program corresponding to the media profiles included in the subset; and
using, by the media streaming system, the media content data representative of the different versions of the media content program corresponding to the media profiles included in the subset to stream the media content program on demand, wherein the using of the media content data to stream the media content program on demand comprises:
receiving a request from a media content access device to access the media content program; and
in response to the request,
determining that the media content access device from which the request is received is associated with a media profile included in the plurality of media profiles,
determining that the media profile associated with the media content access device is not included in the benchmark media profiles,
determining whether available resources satisfy a predetermined threshold,
if the available resources are determined to satisfy the predetermined threshold, identifying a benchmark media profile included in the benchmark media profiles and that represents a next higher media quality level from a media quality level represented by the media profile associated with the media content access device,
if the available resources are determined not to satisfy the predetermined threshold, identifying a different benchmark media profile included in the benchmark media profiles and that represents a next lower media quality level from the media quality level represented by the media profile associated with the media content access device, selecting, from the different versions of the media content program maintained by the media streaming system, a version of the media content program corresponding to the identified benchmark media profile, and using a copy of the selected version of the media content program to stream the media content program to the media content access device from which the request is received.

2. The method of claim 1, wherein the maintaining of the media profile data comprises:

receiving user input specifying the plurality of media profiles; and defining, based on the user input, the media profile data representative of the plurality of media profiles.

3. The method of claim 1, wherein the maintaining of the media profile data comprises:

identifying, from media content access device data, the plurality of media profiles supported by the technical specifications of the media content access devices included in the population of media content access devices; and defining, based on the plurality of media profiles identified from the media content access device data, the media profile data representative of the plurality of media profiles.

4. The method of claim 3, wherein the media content access device data may be included in at least one of media request log data and media streaming log data associated with a media streaming service.

5. The method of claim 1, wherein the maintaining of the media profile data comprises updating the media profile data representative of the plurality of media profiles to represent an updated plurality of media profiles supported by technical specifications of media content access devices included in an updated population of media content access devices.

6. The method of claim 1, wherein the defining of the subset of the plurality of media profiles as the benchmark media profiles comprises:

receiving user input specifying the statistical distribution of the media content access devices across the plurality of media profiles; and identifying the subset of the plurality of media profiles as benchmark media profiles based on the statistical distribution and a benchmark media profile selection heuristic.

7. The method of claim 1, wherein the defining of the subset of the plurality of media profiles as the benchmark media profiles comprises:

generating, based on media content access device data, the statistical distribution of the media content access devices across the plurality of media profiles; and identifying the subset of the plurality of media profiles as the benchmark media profiles based on the statistical distribution and a benchmark media profile selection heuristic.

8. The method of claim 1, wherein the statistical distribution of the media content access devices across the plurality of media profiles is based on at least one of:

a number of media content access devices associated with each media profile included in the plurality of media profiles; and a number of media streaming requests associated with each media profile included in the plurality of media profiles.

9. The method of claim 1, wherein the maintaining of the media content data representative of the different versions of the media content program comprises:

receiving a source version of the media content program from a content provider;

using the source version of the media content program to generate the different versions of the media content program corresponding to the media profiles defined as the benchmark media profiles; and storing the different versions of the media content program in a content delivery network for use by the media streaming system to stream the media content program.

10. The method of claim 9, wherein the storing comprises storing copies of each of the different versions of the media content program in one or more data centers of the content delivery network.

11. The method of claim 1, wherein when the identified benchmark media profile represents the next higher media quality level from the media quality level represented by the media profile associated with the media content access device, the using of the copy of the selected version of the media content program to stream the media content program comprises:

converting the copy of the version of the media content program corresponding to the benchmark media profile to another version of the media content program that corresponds to the media profile associated with the media content access device, and streaming the another version of the media content program that corresponds to the media profile associated with the media content access device to the media content access device.

12. The method of claim 11, wherein the converting comprises downgrading the copy of the version of the media program from the next higher media quality level to the media quality level represented by the media profile associated with the media content access device.

13. The method of claim 1, wherein when the identified benchmark media profile represents the next lower media quality level from the media quality level represented by the media profile associated with the media content access device, the using of the copy of the selected version of the media content program to stream the media content program comprises streaming the copy of the selected version of the media content program corresponding to the benchmark media profile to the media content access device without converting the selected version of the media content program to another version of the media content program.

14. The method of claim 1, embodied as computer-executable instructions on at least one non-transitory computer-readable medium.

15. A method comprising:

maintaining, by a media streaming system, media profile data representative of a plurality of media profiles supported by technical specifications of media content access devices included in a population of media content access devices;

maintaining, by the media streaming system for only a subset of the plurality of media profiles defined as benchmark media profiles, media content data representative of different versions of a media content program, the different versions of the media content program corresponding to the benchmark media profiles;

receiving, by the media streaming system, a request from a media content access device to access the media content program; and in response to the request, determining, by the media streaming system, that the media content access device from which the request is received is associated with a media profile included in the plurality of media profiles, determining, by the media streaming system, that the media profile associated with the media content access device is not included in the benchmark media profiles, determining, by the media streaming system, whether available resources satisfy a predetermined threshold, if the available resources are determined to satisfy the predetermined threshold, identifying, by the media streaming system, a benchmark media profile included in the benchmark media profiles and that represents a next higher available media quality level from a media quality level represented by the media profile associated with the media content access device, if the available resources are determined not to satisfy the predetermined threshold, identifying, by the media streaming system, a different benchmark media profile included in the benchmark media profiles and that represents a next lower available media quality level from the media quality level represented by the media profile associated with the media content access device, selecting, by the media streaming system, from the different versions of the media content program maintained by the media streaming system, a version of the media content program corresponding to the identified benchmark media, and using, by the media streaming system, the selected version of the media content program to stream the media content program to the media content access device from which the request is received.

16. The method of claim 15, wherein the media content program comprises a video content program.

17. The method of claim 16, wherein the using of the selected version of the media content program to stream the media content program to the media content access device from which the request is received comprises using the selected version of the video content program to stream the video content program to the media content access device to fulfill the request on demand.

18. A system comprising:

a media profile management facility configured to maintain media profile data representative of a plurality of media profiles supported by technical specifications of media content access devices included in a population of media content access devices, and define, based on a statistical distribution of the media content access devices across the plurality of media profiles, a subset of the plurality of media profiles as benchmark media profiles;

a media content management facility communicatively coupled to the media profile management facility and configured to maintain, for only the subset of the plurality of media profiles defined as the benchmark media profiles, media content data representative of different versions of a media content program, the different versions of the media content program corresponding to the benchmark media profiles; and a media streaming facility communicatively coupled to the media profile management facility and the media content management facility and configured to use the media content data representative of the different versions of the media content program corresponding to the benchmark media profiles to stream the media content program on demand by:

receiving a request from a media content access device to access the media content program; and in response to the request, determining that the media content access device from which the request is received is associated with a media profile included in the plurality of media profiles, determining that the media profile associated with the media content access device is not included in the benchmark media profiles, determining whether available resources satisfy a predetermined threshold, if the available resources are determined to satisfy the predetermined threshold, identifying a benchmark media profile included in the benchmark media profiles and that represents a next higher media quality level from a media quality level represented by the media profile associated with the media content access device, if the available resources are determined not to satisfy the predetermined threshold, identifying a different benchmark media profile included in the benchmark media profiles and that represents a next lower media quality level from the media quality level represented by the media profile associated with the media content access device, selecting, from the different versions of the media content program maintained by the media streaming system, a version of the media content program corresponding to the identified benchmark media profile, and using a copy of the selected version of the media content program to stream the media content program to the media content access device from which the request is received.

19. The system of claim 18, wherein when the identified benchmark media profile represents the next higher media quality level from the media quality level represented by the media profile associated with the media content access device, the using of the copy of the selected version of the media content program to stream the media content program comprises:

converting the copy of the version of the media content program corresponding to the benchmark media profile to another version of the media content program that corresponds to the media profile associated with the media content access device, and streaming the another version of the media content program that corresponds to the media profile associated with the media content access device to the media content access device.

20. The system of claim 19, wherein the converting comprises downgrading the copy of the version of the media program from the next higher media quality level to the media quality level represented by the media profile associated with the media content access device.

21. The system of claim 18, wherein when the identified benchmark media profile represents the next lower media quality level from the media quality level represented by the media profile associated with the media content access device, the using of the copy of the selected version of the media content program to stream the media content program comprises streaming the copy of the selected version of the media content program corresponding to the benchmark media profile to the media content access device without converting the selected version of the media content program to another version of the media content program.

\* \* \* \* \*